US009789501B2

(12) United States Patent
Krenn

(10) Patent No.: US 9,789,501 B2
(45) Date of Patent: Oct. 17, 2017

(54) THERMAL SPRAY ASSEMBLY AND METHOD FOR USING IT

(71) Applicant: ELEMENT SIX GMBH, Burghaun (DE)

(72) Inventor: Andreas Krenn, Leobersdorf (AT)

(73) Assignee: Element Six GmbH, Burghaun (DE)

( * ) Notice: Subject to any disclaimer, the term of this patent is extended or adjusted under 35 U.S.C. 154(b) by 0 days.

(21) Appl. No.: 15/302,907

(22) PCT Filed: May 22, 2015

(86) PCT No.: PCT/EP2015/061396
§ 371 (c)(1),
(2) Date: Oct. 7, 2016

(87) PCT Pub. No.: WO2015/181076
PCT Pub. Date: Dec. 3, 2015

(65) Prior Publication Data

US 2017/0065991 A1 Mar. 9, 2017

(30) Foreign Application Priority Data

May 31, 2014 (GB) .................................. 1409693.7

(51) Int. Cl.
*B23K 10/00* (2006.01)
*B05B 7/22* (2006.01)
(Continued)

(52) U.S. Cl.
CPC ................ *B05B 7/226* (2013.01); *B05D 1/02* (2013.01); *C23C 4/134* (2016.01); *H05H 1/42* (2013.01)

(58) Field of Classification Search
CPC ........... B05B 7/226; C23C 4/134; B05D 1/02; H05B 1/42; H05B 1/34
(Continued)

(56) References Cited

U.S. PATENT DOCUMENTS 3,114,826 A * 12/1963 Sullivan .................. B05B 7/226 118/69
3,803,380 A 4/1974 Ragaller
(Continued)

FOREIGN PATENT DOCUMENTS

DE 2216981 B1 7/1973
EP 0234848 A2 9/1987
(Continued)

OTHER PUBLICATIONS

United Kingdom Patent Application No. 1409693.7, Combined Search and Examination Report dated Dec. 2, 2014, 5 pages.
(Continued)

*Primary Examiner* — Mark Paschall
(74) *Attorney, Agent, or Firm* — Dean W. Russell; Clark F. Weight; Kilpatrick Townsend & Stockton LLP

(57) ABSTRACT

A thermal spray assembly (10) for transforming precursor material (60) into a layer of deposited material joined to a substrate body. A plasma torch produces a plasma jet from a plasma nozzle (28) and a feeder mechanism (30) guides the precursor material into the plasma jet in use and is capable of providing a feeder orifice when in an open condition. The feeder mechanism (30) is provided with a distribution chamber configured for guiding moving precursor material azimuthally around the plasma torch, a plurality of deflector structures (38) configured for deflecting the precursor material (60) from the distribution chamber and guiding it into a guide chamber configured for guiding the precursor material (60) to the plasma jet in use.

17 Claims, 8 Drawing Sheets

(51) Int. Cl.
*H05H 1/42* (2006.01)
*C23C 4/134* (2016.01)
*B05D 1/02* (2006.01)

(58) Field of Classification Search
USPC ...... 219/121.47, 121.51, 121.5, 76.16, 76.15
See application file for complete search history.

(56) References Cited

U.S. PATENT DOCUMENTS

| | | | | |
|---|---|---|---|---|
| 4,990,739 | A | 2/1991 | Zaplatynsky | |
| 5,019,686 | A * | 5/1991 | Marantz | B05B 7/203 219/76.14 |
| 7,557,324 | B2 * | 7/2009 | Nylen | B05B 7/205 219/121.47 |
| 2008/0116178 | A1 * | 5/2008 | Weidman | H05H 1/42 219/121.47 |
| 2009/0314520 | A1 | 12/2009 | Suss-Wolf et al. | |
| 2013/0095340 | A1 * | 4/2013 | Sivakumar | C23C 4/02 428/548 |
| 2015/0225833 | A1 * | 8/2015 | Kowalsky | C23C 4/127 427/446 |
| 2015/0307980 | A1 * | 10/2015 | Espallargas | C04B 35/62886 427/450 |

FOREIGN PATENT DOCUMENTS

| | | | |
|---|---|---|---|
| GB | 2148768 | A | 6/1985 |
| JP | S62270277 | A | 11/1987 |
| WO | 2013178550 | A1 | 12/2013 |

OTHER PUBLICATIONS

International Patent Application No. PCT/EP2015/061396, International Search Report and Written Opinion dated Jul. 24, 2015.

* cited by examiner

THERMAL SPRAY ASSEMBLY AND METHOD FOR USING IT

CROSS REFERENCE TO RELATED APPLICATIONS

This application is the U.S. national phase of International Application No. PCT/EP2015/061396 filed on May 22, 2015, and published in English on Dec. 3, 2015 as International Publication No. WO 2015/181076 A1, which application claims priority to United Kingdom Patent Application No. 1409693.7 filed on May 31, 2014, the contents of all of which are incorporated herein by reference.

TECHNICAL FIELD

This disclosure relates generally to thermal spray assemblies and methods of using them to deposit material on a substrate, particularly but not exclusively for depositing a hard layer onto a steel body, such as a tool for mining, earth boring or road milling.

BACKGROUND ART

International patent application, publication number WO/2013/178550 discloses a method for making a construction comprising a steel substrate body coated with a layer of relatively harder material. The method may include providing a plurality of granules comprising iron (Fe), silicon (Si) and a source of carbon (C), in which the relative quantities of the Fe, Si and are selected such that the combination of the Fe, Si and C has a phase liquidus temperature of at most about 1,280 degrees Celsius; and depositing the granules onto the substrate body by means of a thermal spray assembly. The thermal spraying process will involve heating the granules to a temperature of at least about 1,350 degrees Celsius at a mean rate of at least about 100 degrees Celsius per second, and the cooling of the granules to less than about 1,000 degrees Celsius at a mean rate of at least about 20 degrees per second on contact with the substrate body.

There is a need to provide an apparatus and method for efficiently spraying material having a relatively low melting point, granules for use with the thermal spray device and methods of using it.

SUMMARY

Viewed from a first aspect, there is provided a thermal spray assembly for transforming precursor material into a layer of deposited material joined to a substrate body; comprising a plasma torch for producing a plasma jet from a plasma nozzle and a feeder mechanism for guiding the precursor material into the plasma jet in use and being capable of providing a feeder orifice when in an open condition; the feeder mechanism comprising a distribution chamber configured for guiding moving precursor material azimuthally around the plasma torch, a plurality of deflector structures configured for deflecting the precursor material from the distribution chamber and guiding it into a guide chamber configured for guiding the precursor material to the plasma jet in use. When the thermal spray assembly is in the assembled condition, it may be referred to as a thermal spray device.

Various arrangements and combinations are envisaged for thermal spray assemblies, both in the assembled and in non-assembled states, non-limiting and non-exhaustive examples of which are described below.

In some example arrangements, the feeder mechanism may comprise a moveable guide mechanism and be configured such that the guide chamber is capable of guiding the precursor material to the feeder orifice, through which the precursor material can move from the guide chamber and enter the plasma jet at a variable mean distance from the plasma nozzle in response to movement of the guide mechanism.

In some example arrangements, the deflector structures may comprise projections spaced apart from each other and extending from the distribution chamber to the guide chamber.

In some example arrangements, the deflector structures may be arranged such that the precursor material can be deflected into the guide chamber, distributed substantially uniformly azimuthally within the guide chamber.

In some example arrangements, the thermal spray assembly may comprise at least two elements capable of being coupled together, one element comprising the plasma torch and the other element comprising a containment vessel for accommodating the plasma torch; the elements being cooperatively configured such that the feeder mechanism will be formed when the elements are coupled together.

In some example arrangements, the feeder mechanism can be put in a closed condition, in which precursor material will be prevented from entering the plasma jet.

In some example arrangements, the feeder mechanism can be configured such that different portions of the precursor material can simultaneously be directed into the plasma region from a plurality of directions converging on the plasma jet.

In some example arrangements, the volume of the guide chamber may converge with closer proximity to the feeder orifice.

In some example arrangements, the guide chamber may be bounded by inner and outer cone surfaces of respective inner and outer bodies, the inner and outer cone surfaces defining respective cone angles that differ by 4 to 10 degrees.

In some example arrangements, the feeder orifice may have an annular form when in an open condition, extending azimuthally around the axis of the plasma jet in use.

In some example arrangements, the thermal spray assembly may be for plasma transferred arc (PTA) operation.

In some example arrangements, the guide mechanism can be arranged operative to alter the path of precursor material that has passed through the feeder orifice.

In some example arrangements, the position of the feeder orifice relative to the plasma torch, and or the size and or shape of the feeder orifice can be varied in response to arrangement of the guide mechanism.

In some example arrangements, the guide mechanism may be coterminous with the feeder orifice such that the guide mechanism provides the feeder orifice with a moveable boundary.

In some example arrangements, the guide mechanism can be moved axially relative to the plasma torch, the axis defined by the direction of the plasma jet in use.

In some example arrangements, the guide mechanism may comprise a moveable sleeve extending azimuthally about the plasma torch.

In some example arrangements, the guide mechanism can be arranged such that the feeder orifice can provide an axial displacement of up to 1 millimeter (mm) between opposite boundaries of the feeder orifice, the axial displacement being aligned with the direction of the plasma jet in use.

In some example arrangements, the feeder mechanism may be configured such that the guide mechanism provides an outer boundary of the guide chamber and the plasma torch provides an inner boundary of the guide chamber.

In some example arrangements, the feeder orifice may be provided as a gap between a boundary of the guide mechanism and the plasma torch.

In some example arrangements, the guide chamber may extend azimuthally around the plasma torch when the thermal spray assembly is in the assembled state.

While wishing not to be bound by a particular theory, the temperature within the plasma jet will likely vary with axial distance from the plasma nozzle, and a suitable mean distance from the plasma nozzle at which given precursor material may enter the plasma jet may depend to some extent on the melting point, or eutectic phase temperature of the precursor material. In some examples, the precursor material may be in granulated form, such as powder or granules comprising respective aggregations of grains. The precursor material may comprise a plurality of different materials, which may be combined within each granule and or within different granules.

A method of using a disclosed thermal spray assembly in the assembled state (in other words, a method of using a disclosed thermal spray device) can be provided, the method including providing precursor material capable of melting at a temperature of less than 1,300 degrees Celsius, and introducing it into the feeder mechanism by means of a flowing carrier fluid; arranging the moveable guide mechanism such that the precursor material enters the plasma jet sufficiently far away from the plasma nozzle that it does not adhere to the thermal spray device on melting in the plasma jet.

In some examples, the guide mechanism may comprise a sleeve that extends all the way around the plasma torch and is axially moveable relative to the plasma torch, the feeder orifice may be provided as an annular axial gap, a boundary of which is coterminous with a boundary of the sleeve such that the axial gap is variable in response to axial movement of the sleeve; and in which the precursor material may be capable of melting at a temperature of 1,000 and 1,300 degrees Celsius; and the method may include arranging the sleeve such that the axial gap of the feeder orifice is 0.2 to 0.5 mm.

In some examples, the combined precursor material may melt at no less than about 800 or 1,000 degrees Celsius. If the melting point of the precursor material is too low, there is a risk that material may evaporate while within the plasma jet and be lost to the thermal spray process. In some examples, the (combined) precursor material may be capable of melting at a temperature of at most about 1,300 degrees Celsius, less than 1,280 degrees Celsius or at most about 1,200 degrees Celsius.

In some examples, the precursor material may be suitable for depositing a hard layer of material onto a steel body, the hard layer having Vickers hardness of at least 800 HV10; the precursor material being transformed into the hard material by being thermally sprayed onto the steel body.

In some examples, the precursor material may comprise a combination of iron (Fe), silicon (Si), a source of carbon (C) and grains comprising metal carbide material, in which the relative quantities of the Fe, Si and C are selected such that the combination of the Fe, Si and C has a phase liquidus temperature of at most about 1,300 degrees Celsius, less than 1,280 degrees Celsius or at most about 1,200 degrees Celsius.

The method may include using a disclosed example thermal spray device for spraying material onto a body of a tool comprising or consisting of steel. For example, the tool body may be for a pick for pavement degradation or mining, or a drill bit for boring into rock. In some examples, the tool body may be for some other tool or component at risk of being worn or corroded in use. In general, the method may include depositing a relatively harder layer onto a wear part.

In some examples, the precursor material is suitable for depositing a hard layer of material having hardness substantially greater than that of the steel comprised in the body. The deposited material may form a layer that is capable of reducing the rate of corrosion and or mechanical wear of the tool body in use.

DETAILED DESCRIPTION

Figure 1:
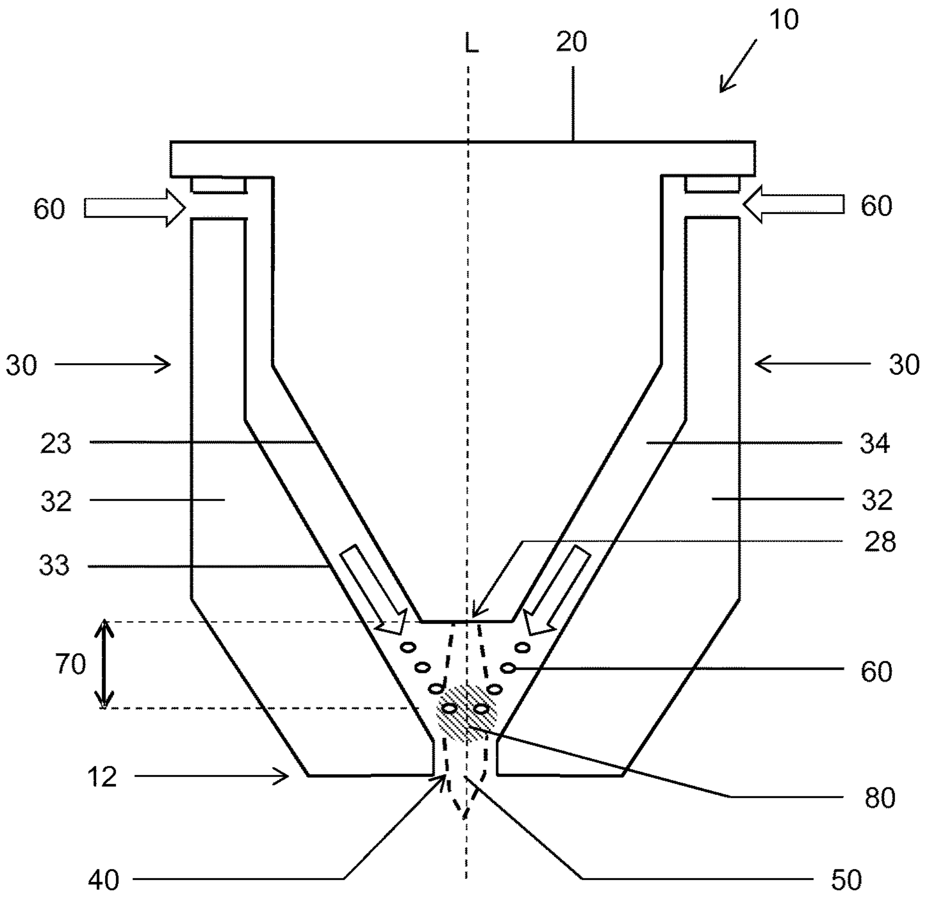
FIG. 1 shows a schematic cross section view of an example thermal spray assembly in the assembled state, in use.

With reference to FIG. 1, an example thermal spray assembly 10 (shown in the assembled state, as a thermal spray device 10) for transforming precursor material 60 into a layer of deposited material joined to a substrate body (not shown); comprising a plasma torch 20 and a feeder mechanism 30, configured such that the plasma torch 20 is capable of producing a plasma jet into a plasma region 50, to be occupied by the plasma jet and to extend from the plasma nozzle 28 in use. The feeder mechanism 30 is capable of guiding the precursor material 60 into the plasma region 50. The feeder mechanism 30 is capable of providing a feeder orifice 70 when in an open condition (as sown in FIG. 1) and comprises a guide chamber 34 and a moveable guide mechanism 32. The feeder mechanism 30 is configured such that the guide chamber 34 is capable of guiding the precursor material 60 to the feeder orifice 70, through which the precursor material 60 can move from the guide chamber 34 and enter the plasma region 50 at a variable mean distance from the plasma nozzle 28 in response to movement of the guide mechanism 32.

The arrangement of the feeder orifice 70 is variable, such that the precursor material 60 can be selectively fed into any of various zones within the plasma region 50, having different respective mean axial distances from the plasma nozzle 28 (an example zone 80 is illustrated in FIG. 1). In other words, the precursor material 60 can be fed into a zone 80 of the plasma region 50 at a selected axial distance from the spray end 12 of the plasma torch 20 from which the plasma jet is emitted through the plasma nozzle 28. In some example arrangements, a longitudinal axis L may be defined by a cylindrical axis of the plasma torch 20, the plasma jet (in use), the plasma nozzle 28, a spray orifice 40 formed by the guide mechanism 32 or the feeder mechanism 30, or more than one of these features arranged coaxially. For example, the longitudinal axis may lie coaxially with the spray orifice 40 and the plasma torch 20.

In the particular example illustrated in FIG. 1, the guide mechanism 32 may be a moveable containment housing configured to accommodate part of the plasma torch 20 depending from the spray end 12. The housing 32 may be axially moveable relative to the plasma torch 20 and the arrangement of the feeder orifice 70 may be variable in response to the movement of the containment housing 32 along a longitudinal axis L through the spray orifice 40 and aligned with the plasma jet 50 in use. The area defined by the feeder orifice 70 will be variable in response to movement of the containment housing 32, the axial length of the feeder orifice 70 being variable in response to movement of the containment housing 32. For example, the feeder orifice 70 may be capable of being varied between 0 and 0.5 millimeters; the distance of 0 mm corresponding to a closed condition of the thermal spray assembly 10 not shown in FIG. 1, in which the containment housing 32 will contact the plasma torch 20 and prevent the precursor material 60 from being fed into the plasma jet. In this example, the feeder orifice 70 extends circumferentially all the way around the plasma region 50 and the feeder mechanism 30 is capable of introducing the precursor material 60 into the plasma jet 50 from converging directions extending azimuthally all the way around the plasma region 50.

In the example shown in FIG. 1, the guide chamber 34 is formed between the plasma torch 20 and the containment housing 32, extending circumferentially around the plasma torch 20. The containment housing 32 comprises a conical inner surface 33 spaced apart from a conical outer surface 23 of the plasma torch, forming the guide chamber 34 between them. The containment housing 32 and the plasma torch 20 are substantially coaxial along the longitudinal axis L. In some examples, the cone angle defined by the inner conical surface 33 of the containment housing 32 may be greater than that defined by the conical outer surface 23 of the plasma torch 20, resulting in the guide chamber 34 between them becoming narrower with increased proximity to the feeder orifice 70.

Figure 2:
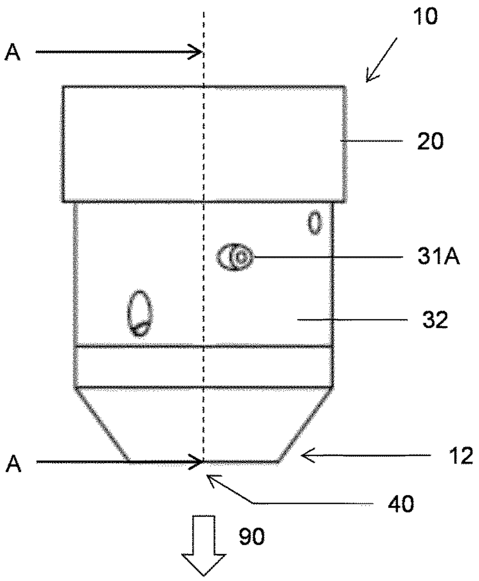
FIG. 2 shows a schematic side view of an example of an example plasma transferred arc (PTA) thermal spray assembly in the assembled state.

FIG. 2 shows a side view of an example thermal spray assembly 10 in the assembled state. It comprises a plasma torch 20 and a moveable containment housing 32 (the guide mechanism in this example), a part of the plasma torch 20 (not visible in FIG. 2) being housed within a cooperatively configured cavity formed by the containment housing 32. An inlet orifice 31A is provided for granular precursor material to be introduced into the feeder mechanism and subsequently conveyed into a plasma jet (not shown) generated by the plasma torch 20 to produce a jet 90 comprising the plasma and material ejected from a spray orifice 40 at a spray end 12 of the thermal spray assembly 10.

Figure 3:
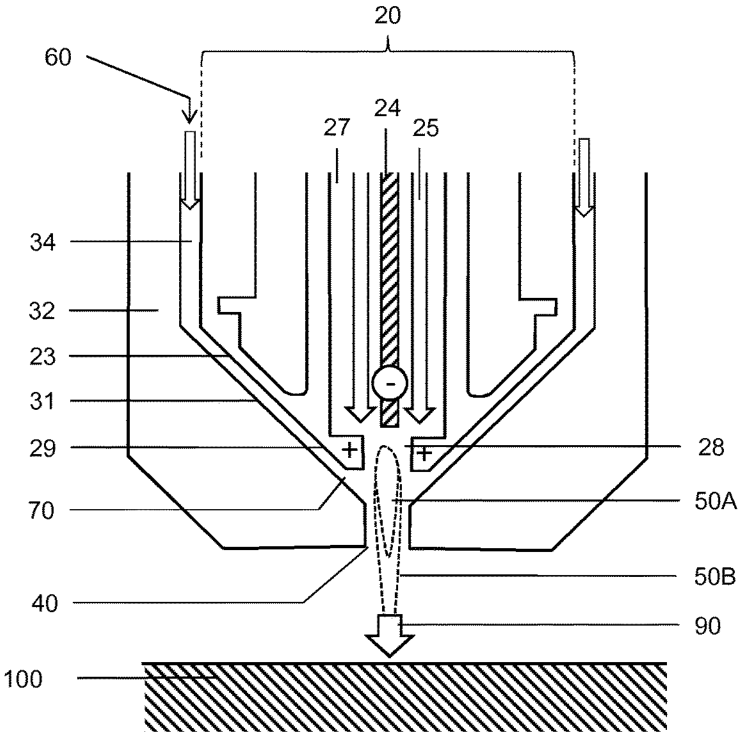
FIG. 3 shows a schematic cross section view A-A of the example plasma transferred arc thermal spray assembly shown in FIG. 2, in use.

FIG. 3 schematically illustrates the operation of a plasma transferred arc (PTA) thermal spray assembly for depositing material onto a substrate 100, in which a potential difference is established between a cathode 24 and surrounding anode 29, as well as the substrate 100. In the particular example shown, part of the plasma torch 20 is located within a cavity formed by a moveable containment housing 32 (the guide mechanism in this example), configured such that an inner surface 31 of the containment housing 32 is spaced apart from an outer surface 23 of the plasma torch 20 to provide a guide chamber 34 through which granular precursor material 60 can be transported towards a feeder orifice 70 provided by the feeder mechanism 30 in the open condition, and ultimately into a pilot plasma 50A, and a transfer plasma 50B, in use. The plasma torch 20 and the containment housing 32 are configured such that the feeder orifice 70 is located proximate a plasma nozzle 28 (which may also be referred to as a 'constrictor nozzle') of the plasma torch 20. The plasma nozzle 28 and the spray orifice 40 may be coaxial such that a pilot plasma 50A generated proximate the constrictor nozzle 28 can project into (or through) the spray orifice 40 and towards the substrate body 100.

The plasma torch 20 may comprise a central cathode 24, which may comprise tungsten (W) metal, and a plasma nozzle 28 at least partly surrounding the cathode 24 and defining at least part of a chamber 27 within which the cathode 24 is located, the cathode 24 and plasma nozzle 28 configured to be capable of generating an electrical arc between them. In use, inert gas 25 such as argon (Ar) will flow past the cathode 24 towards the plasma nozzle 28. The cathode 24, plasma nozzle 28 and chamber 27 are configured such that the inert gas 25 can be ionised and a pilot plasma jet 50A generated proximate the plasma nozzle 28, the pilot plasma jet 50A projecting outwards from the chamber 27, into the spray orifice 40 and towards the substrate 100. When the thermal spray assembly is positioned sufficiently near the substrate 100 and operating conditions are achieved, a transfer plasma jet 50B will be generated and extend between the cathode 24 and the substrate 100, projecting beyond the spray orifice 40. The temperature within the pilot plasma jet 50A may be about 15,000 degrees Celsius and that within the transfer plasma jet 50B may be about 3,000 to about 4,000 degrees Celsius. In general, the temperature within the plasma jet 50A, 50B will vary substantially at different axial positions in the plasma jet, being different axial distances from the plasma nozzle 28.

In general, precursor material 60, which may be in in granular form, and which will likely have been selected such that it can be transformed by the thermal spray operation into the material to be deposited onto the substrate 100. In use, the precursor material 60 will be introduced into the thermal spray assembly and conveyed into the guide chamber 34, in which it may be further conveyed along convergent paths towards the feeder orifice 70 and ultimately the plasma jet 50B. The flux of the granules 60 converging on the plasma jet 50B will generally be controllable. As used herein, a flux of the granules can be expressed in terms of number of granules passing through a plane per unit time, and incorporates aspects of velocity and spatial density of the granules. The flux of granules 60 injected into the plasma jet 50B will be affected by the area defined by the feeder orifice 70, the density of the granules 60 within the carrier gas and the velocity of the granules 60 towards the plasma jet 50B. The velocity of the granules 60 can be controlled by the flow rate of the carrier fluid and a convergent configuration of the guide chamber 34.

When the granules 60 are injected into the plasma jet 50B, their temperature will increase very rapidly, potentially permitting the precursor material to undergo phase changes and chemical reactions as may be necessary for desired material to be deposited onto the substrate 100. A jet 90 of material may be ejected at relatively high velocity from the thermal spray assembly towards the substrate 100. When the material strikes the substrate 100, it may tend to 'splat' onto the substrate, begin cooling and, depending on the reaction and phase change kinetics, form the desired material in the solid state, attached to the substrate 100.

It will likely be important to control parameters such as the composition and mechanical properties of the granules, the flow rate of the carrier fluid, the number density of the granules within the carrier fluid, the flux of the granules injected into the plasma, the potential difference between the cathode and anode and substrate, the electric current of the pilot and transfer plasma arcs, the flow rate of the inert gas, the dispersion of the granules azimuthally about the plasma torch and the feeder orifice, and the configuration of the guide chamber.

Figure 4A:
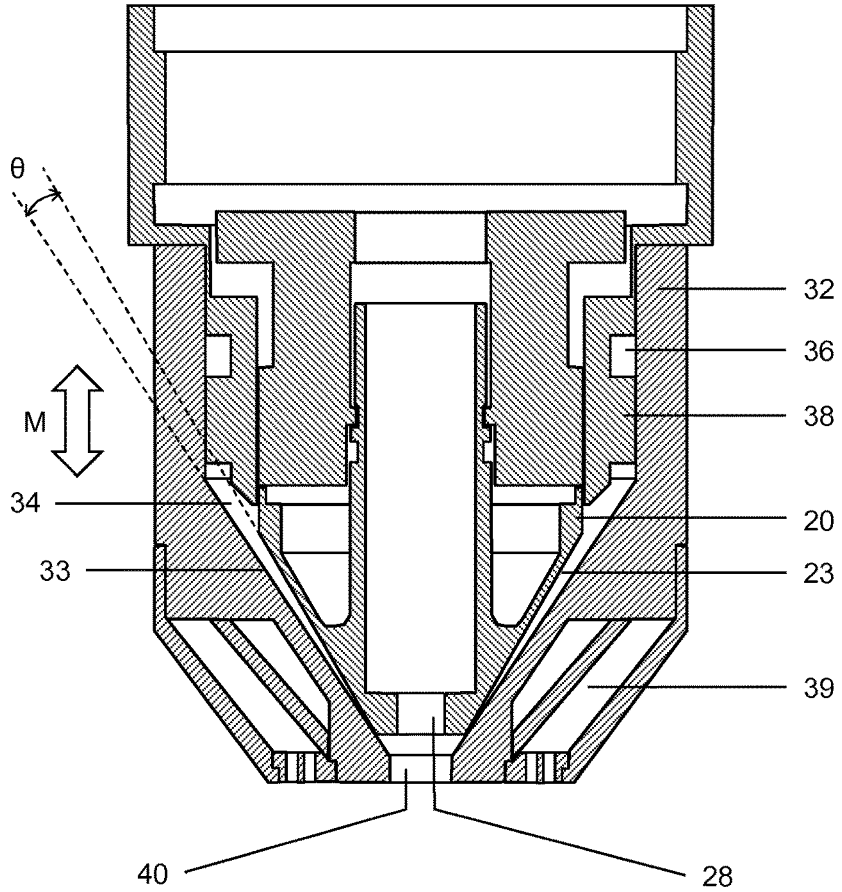
FIG. 4A shows a schematic cross section view of an example thermal spray assembly in the assembled state, in the closed condition.
Figure 4B:
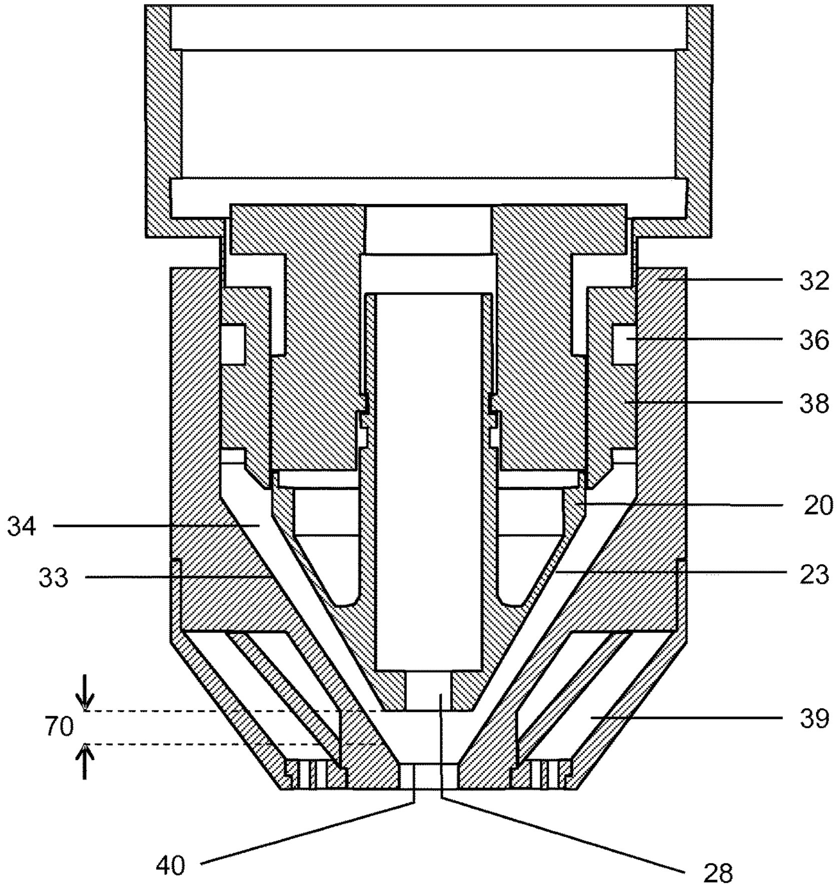
FIG. 4B shows the example thermal spray assembly in an open condition, as in use.

With reference to FIG. 4A and FIG. 4B, an example thermal spray assembly in the assembled state (in other words, a thermal spray device) can be placed in a closed condition, as shown in FIG. 4A, or an open condition, as shown in FIG. 4B, by adjusting the position of the containment housing 32 (the moveable guide mechanism, in the illustrated example) in one of the directions indicated by M. In other example arrangements, the containment housing 32 may be moveable in other directions, such as rotationally and or laterally. The containment housing 32 can be moveable with respect to the plasma nozzle 28, its position capable of being adjusted towards or away from the plasma nozzle 28 and the exterior surface 23 of plasma torch 20, thus decreasing or increasing the volume of the guide chamber 34 and consequently the potential flux of granular precursor material towards the plasma jet in use. The thermal spray assembly may be provided with an adjustment mechanism (not shown) to perform this adjustment.

In the closed condition as shown in FIG. 4A, granular precursor material (not shown) that may be in the guide chamber 34 will be unable to exit the guide chamber 34 and move toward the spray orifice 40 and the plasma region (not shown). In the example shown in FIG. 4A, this may be achieved by adjusting the position of the containment housing 32 such that at least a part of the interior surface 33 of the containment housing 32 abuts at least part of the exterior surface 23 of the plasma torch 20 proximate the spray orifice 40, thus reducing the space between them substantially to zero. In the particular example shown in FIG. 4A, the interior surface 33 of the containment housing 32 and exterior surface 23 of the plasma torch 20 proximate the spray orifice 40 are both substantially cone shaped, each defining a somewhat different cone angles, that of the former being greater than that of the latter by an angle 2θ. In some examples, 2θ may be about 7.4 degrees and θ may be 3.7 degrees. In other words, the guide chamber 34 may converge towards the spray orifice 40. In the closed condition, these mutually converging conical surfaces 33, 23 may abut each other proximate the spray orifices 40. When the feeder mechanism is in the open condition as illustrated in FIG. 4B, a likely effect of the narrowing guide chamber 34 towards the spray orifice 40 may be to accelerate and focus the flux of precursor material.

In the open condition as shown in FIG. 4B, the containment housing 32 has been adjusted to a position such that its interior surface 33 is further away from the corresponding exterior surface 23 of the plasma torch 20. A feeder orifice 70 will thus be provided between these surfaces 23, 33 at the narrowest spacing between them, proximate the spray orifice 40 and the plasma region (not shown). The feeder orifice 70 will permit precursor material to pass out of the guide chamber 34 and into the plasma region, where a plasma jet will be present in use (in a PTA device, this will be the transfer plasma). In the example shown, the feeder orifice 70 will be generally cylindrical in shape and coaxial with the plasma torch 20. The flux of precursor material arriving at the plasma region in use can be thus controlled by moving the containment housing 32 axially relative to the plasma torch 20 and consequently varying the area and axial spacing of the feeder orifice 70 by varying the position of the lower end of the feeder orifice 70, formed by part of the interior surface 33 of the containment housing 32.

In some examples, precursor material may be introduced continuously into the thermal spray assembly by means of a fluid carrier medium, such as Ar gas, within which the precursor material may be dispersed and suspended. The precursor material and the carrier fluid may be distributed by the feeder mechanism to disperse the precursor material azimuthally within the guide chamber 34 and consequently azimuthally about the spray orifice 40 and the plasma jet in use. A shielding gas chamber 39 will provide gas through a plurality of orifices surrounding the plasma jet in use for shielding the plasma jet and the material being sprayed from oxygen in the air.

Figure 5:
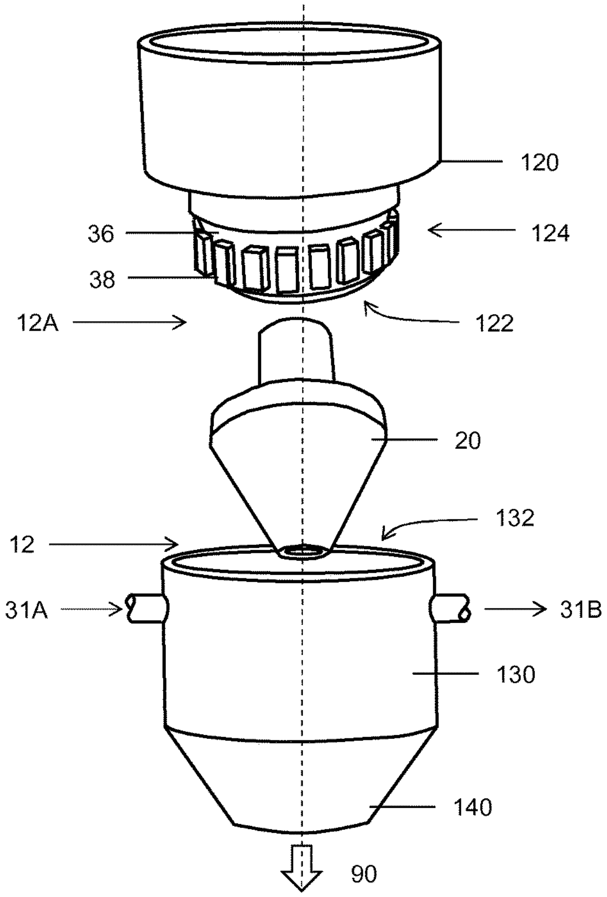
FIG. 5 shows a schematic side perspective drawing elements of a thermal spray assembly in partly unassembled state.
Figure 6:
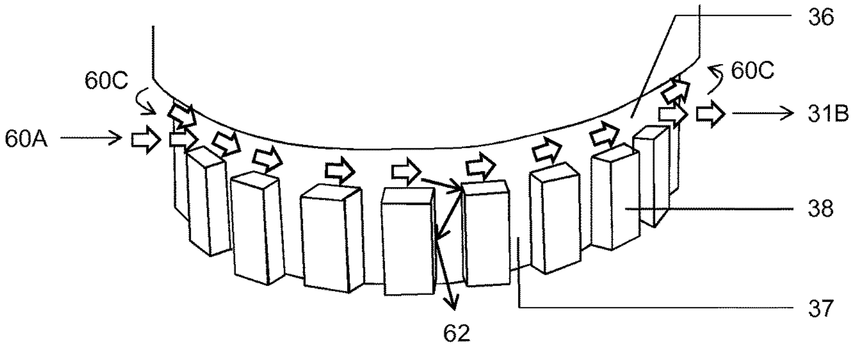
FIG. 6 shows a schematic side perspective view of part of an example feeder mechanism for an example thermal spray assembly.

With reference to FIG. 5 and FIG. 6, an example the thermal spray assembly may comprise first, second, third and fourth elements 20, 120, 130, 140 in which the first element consists of the plasma torch 20. The first element 20 may be attachable to the second element 120 comprising an upper housing cavity 122 by a threaded attachment mechanism depending from an attachment end 12A of the plasma torch 20. A third element 130 may comprise a lower housing cavity 132 for accommodating an opposite spray end 12 of the plasma torch 20, and may be configured for housing part 124 of the second element 120. In other words, a part 124 of the second element 120 may be 'sandwiched' between the plasma torch 20 on its inner side, and the wall of the lower housing cavity 132 on its outer side. A fourth element 140 comprising a cooling mechanism and a shielding gas supply mechanism may be configured to accommodate part of the third element 130 and surround the spray end 12 of the plasma torch 20.

The feeder mechanism may comprise certain features of the first, second and third elements 20, 120, 130, when assembled, and the precursor material will be conveyed through channels and or chambers formed by communicating spaces between these elements. For example, the second element 120 may comprise a circumferential channel, which will define part of a distribution chamber 36 when housed within the housing cavity 132 of the third element 130, which will form a boundary of the distribution chamber 36. The distribution chamber 36 will be capable of guiding precursor material generally azimuthally around the plasma torch 20. A plurality of mutually spaced-apart deflector structures 38 arranged azimuthally around the plasma torch 20, adjacent the distribution chamber 36, in the form of radial projections from the second housing 120, will deflect circulating precursor material 60C into deflection channels 37 and guide the deflected precursor material 62 generally axially into the guide chamber. The third element 130 may comprise an inlet 31A orifice for introducing the precursor material and a carrier fluid into the distribution chamber 36, and an outlet orifice 31B for permitting carrier fluid and potentially some of the precursor material to escape from the thermal spray assembly, potentially for re-use.

In use, the precursor material 60A and carrier fluid may be introduced into the distribution chamber 36 and be guided to circulate within the distribution chamber 36 as circulating precursor material 60C. An effect of the precursor material 60C circulating within the distribution chamber 36 will likely be to distribute the precursor material 60C substantially uniformly around the plasma torch 20 (azimuthally). Some of the circulating precursor material 60C will strike the sides of the deflector structures 38 and be conveyed along generally axial paths 62 within deflection channels 37, into the guide chamber (not shown in FIG. 5 and FIG. 6). If the deflector structures 38, and consequently the deflection channels 38, are arranged at regular spacing intervals all the way around plasma torch 20, the precursor material granules 60C will likely be introduced into the guide chamber at similarly regular spaced intervals. The uniformity of the flux of precursor material circumferentially within the guide chamber will likely depend on the widths and number of deflector structures 38, the more numerous and densely packed the deflector structures 38, the more uniformly the precursor material will likely be dispensed into the guide chamber.

Figure 7:
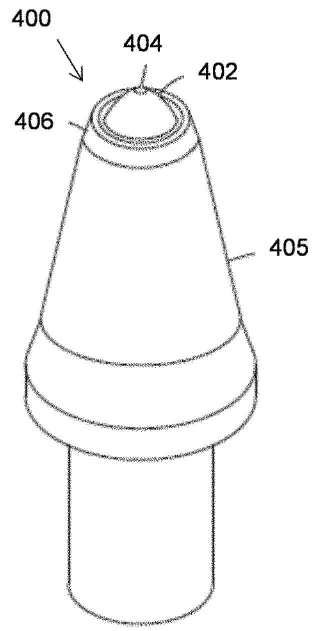
FIG. 7 and FIG. 8 show example pick tools for road milling or mining, each provided with an example protective layer.

With reference to FIG. 7, an example pick tool 400 for mining comprises a steel base 405 and a hard-face layer 406 fused to the steel substrate 405. The hard-face layer may be deposited onto the steel substrate 405 by means of a disclosed thermal spray device. The pick tool 400 may comprise a cemented carbide tip 402 having a strike point 404 and joined to the steel base 405. In some examples the tip 402 may comprise diamond material such as PCD material or silicon carbide-bonded diamond material. The hard-face layer 406 may be arranged around the cemented carbide tip 402 to protect the steel substrate 405 from abrasive wear in use. In use breaking up a rock formation comprising coal or potash, for example, rock material the hard-face layer will likely reduce abrasion of the steel base 405, substantially reducing the risk of premature failure of the pick tool 400.

Figure 8:
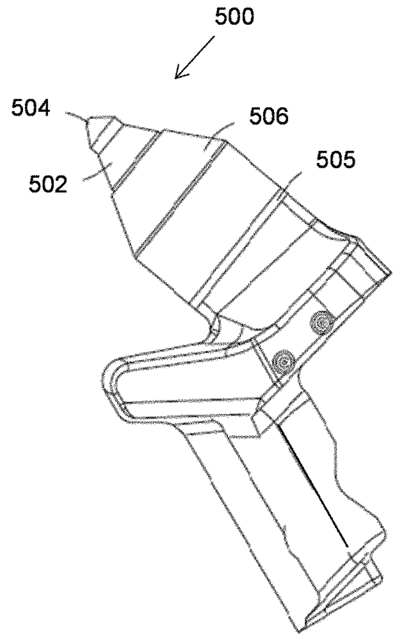

With reference to FIG. 8, an example pick tool 500 for a road pavement milling comprises a steel holder 505 provided with a bore, and a strike tip 504 joined to a cemented carbide base 502 that is shrink fit or press fit into the bore. A hard-face layer 506 may be fused to the steel holder 505, arranged around the bore to protect the steel holder body 505 from wear in use. The hard-face layer may be deposited onto the steel holder 505 by means of plasma transferred arc (TPA) thermal spraying, using a disclosed thermal spray device. The strike tip 504 may comprise a PCD structure joined to a cemented tungsten carbide substrate.

A non-limiting example of thermal spray device and its use to deposit a relatively hard layer of material onto a steel body will be described below in more detail.

A first plurality of granules having combined mass of 200 kg was prepared as follows:

a. Blending: 144 kg tungsten carbide (WC) having mean grain size of 0.8 micron, 30 kg of iron (Fe) powder having mean grain size of about 1 micron, 15 kg of chromium carbide ($Cr_3O_2$) powder having mean grain size of 1 to 2 micron, 6 kg of silicon (Si) powder and 4 kg of paraffin wax and blended by milling the powders together in an attritor mill for three hours, using an alcohol as milling medium and a plurality of cemented tungsten carbide balls having a combined mass of 800 kg to provide precursor material slurry. The slurry was dried to provide blended powder and agglomerations were broken up to provide loose powder.
b. First granulation: The powder was granulated by rolling it in a rotating drum combined with a binder material and then sieved to provide a plurality of granules having a mean size of about 75 to about 225 microns, to provide a plurality of 'green' granules (in other words, granules comprising powder grains held together by means of binder material).
c. Preliminary heat treatment: The green granules were placed into graphite boxes and heated to a temperature of 1,020 degrees Celsius. This temperature was sufficiently low for substantially no liquid phase sintering of the material to take place, and sufficiently high for substantially all of the binder material to be removed and a sufficient degree of solid phase sintering of the powders to provide the granules with sufficient strength to be handled.
d. Second granulation: After the heat treatment, the granules were sieved to select a plurality of the granules having diameter of about 75 to 225 microns.
e. Sintering heat treatment: The selected granules were then again placed into graphite boxes and sintered at a temperature of 1,160 degrees Celsius in vacuum for 45 minutes to permit substantial liquid phase sintering of the granules and provide sintered granules. During the sintering process, while a certain amount of chromium carbide ($Cr_3C_2$) will likely decompose, only a relatively small amount of the WC may dissolve into the binder material. While wishing not to be bound by a particular hypothesis, potentially substantially all of the chromium carbide ($Cr_3C_2$) may dissolve in the liquid binder material and crystallisation of mixed carbide compound material, comprising iron group metal (such as Fe or Co), Cr and C may occur during solidification of the material. The amount of dissolved WC will likely be approximately 5 to 8 mass %, corresponding to at most approximately 1.5 to 2.5 atomic %, which will likely not substantially affect melting temperature of the binder material. If the granules had contained substantially more iron than they did, the risk of substantial melting of the granules would have been high, resulting in a large, hard aggregation of iron-based material by the end of the sintering heat treatment, which would have made it very difficult to break up the aggregation to provide the first plurality of granules. However, if there had been too little iron present in the granules, there would not have been sufficient liquid phase sintering of the material and the granules would very likely have lack sufficient strength. For example, if it were attempted to provide and use just one plurality of granules for the thermal spray process, avoiding the need to introduce a further plurality of iron-rich granules, the granules would have needed to comprise about 69 mass % of iron instead of the 15 mass % used in this example, which would have resulted in a hard, iron-based body that would likely have been non-viably difficult to granulate.
f. Third granulation: The sintered granules were hot isostatically pressed (HIP) in an argon (Ar) atmosphere at a pressure of 50 bar, resulting in a compacted body. The compacted body was then broken up and granules having size of about 60 to 180 microns were selected by means of sieving to provide the first plurality of granules.

The granules of the first plurality (which may also be referred to as the 'first granules') were substantially deficient in iron and would not have been viable for thermally spraying and fusing them successfully onto a substrate body, even though the body comprised steel. While it might be theoretically possible to spray the iron-deficient first granules onto the substrate without introducing additional granules comprising Fe, using Fe present in the steel plate on which the granules are to be sprayed, the energy required to do this would likely be very high.

Figure 9:
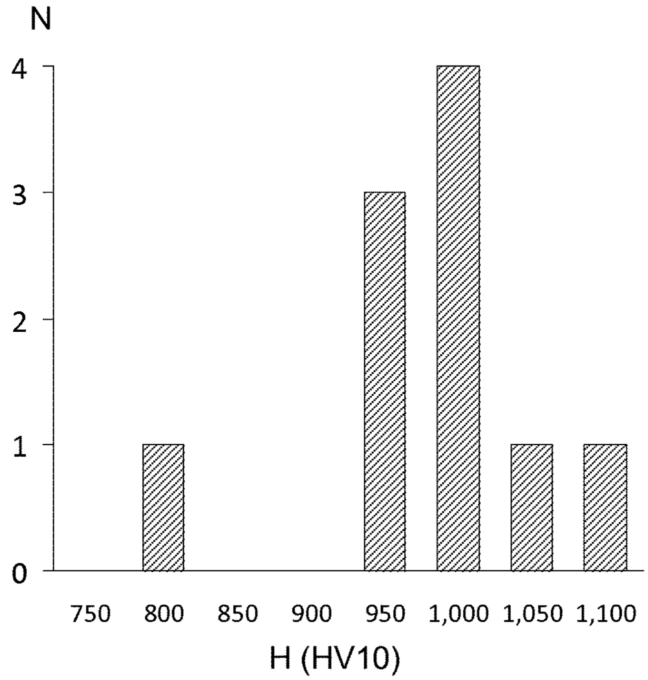
FIG. 9 shows a graph of the number frequency distribution of the hardness of example granules.

The size distribution of the first granules was such that the d(10) value was 90 microns, the median size (d(50)) was 141 microns and the d(90) size was 221 microns (in other words, 10%, 50% and 90% of the granules were less than or equal to 90, 141 and 221 microns in diametrical size, respectively). A sample of five granules was randomly selected for destructive mechanical testing. Each granule was placed on a rigid stage and a rigid plate was slowly pressed against the granule at a constant speed, thus compressing it with an increasing force of as little as 50 millinewtons (mN) and a maximum of 2,000 Newtons (N), until the granule broke. Since the mechanical properties of the granules will likely depend on the size of the granule, the tested granules had diametrical size of 125 to 160 microns. And mean diameter of 141±14 microns. The failure load of the granules was measured to be 6.0±2.3 Newtons (N) and the compressive strength of the granules was 402.6±187.9 megapascals (MPa), taking loading deformation of the granules into account. The number frequency N distribution of the granules as a function of Vickers hardness H (HV10) is shown in FIG. 9. The method used to manufacture the granules succeeded in producing granules that were relatively hard, dense and strong.

A second plurality of granules consisting of commercially Fe grains prepared by means of water atomisation was provided (in particular, Höganäs™ ABC 100.30 was used) and sieved to extract the grains falling in the size range of about 60 to 180 microns. The compressive strength of the Fe granules of the second plurality was not measured because of their irregular shape as a result of the water atomisation (if the second granules had been made by means of gas atomisation, they would likely have been more spherical and their compressive strength might have been measured; the flowability of the second plurality of granules would likely have been enhanced to some degree as well).

Figure 10:
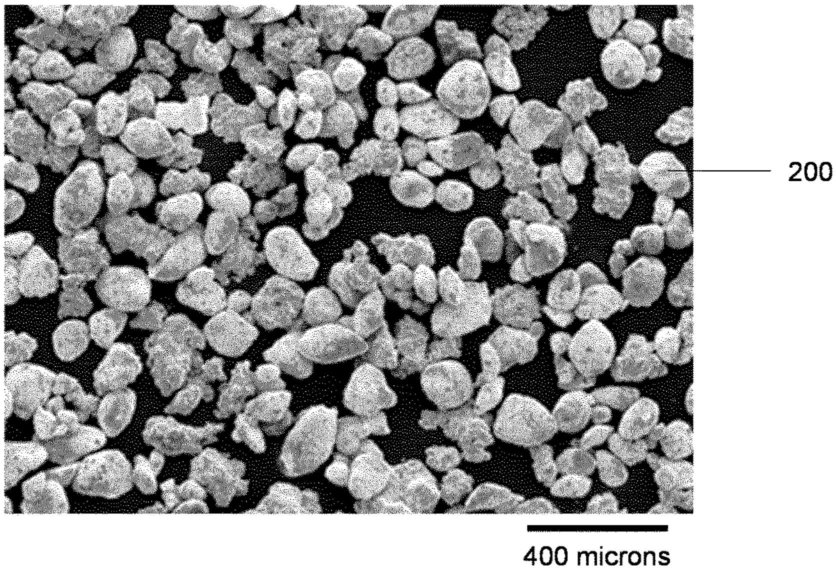
FIG. 10 shows a photograph of a plurality of example combined first and second pluralities of granules.

The first and second granules were blended together at a mass ratio of 75:25 to provide a combined plurality of granules comprising about 35 mass percent Fe overall. FIG. 10 shows a micrograph of a combination of the first 200 and second pluralities of granules. The composition of each of the granules of the first and second pluralities are summarised in table 1. The blended granules were suitable for being thermally sprayed, having a good balance of ease of welding on the one hand and hardness on the other.

TABLE 1

| Material | 1st Granules Mass, kg | 1st Granules Mass, % | 2nd Granules Mass, % | 25% 1st Granules + 75% 2nd Granules combined, mass % | |
|---|---|---|---|---|---|
| Fe | 30 | 15 | 100 | 69 | Composition of the binder material in which the WC grains are dispersed |
| Cr | | | | 19 | |
| C | | | | 3 | |
| Si | 6 | 3 | | 9 | |
| $Cr_3C_2$ | 15 | 7.5 | | 22 | = 19 mass % Cr + 3 mass % C |
| WC | 144 | 72 | | | |
| paraffin wax | 4 | 2 | | | |
| Total | 200 | 100 | 100 | | |

The combined granules were then spayed onto a steel plate by means of the example plasma transferred arc (PTA) thermal spray device of a kind described above with reference to FIG. 4A and FIG. 4B, thus depositing a relatively hard and wear resistant layer of material onto it. The steel plate was 100 millimeters (mm) long, 60 mm wide and 10 mm thick. The axial position of the containment housing 32 relative to the plasma torch 20 was adjusted such that the feeder orifice 70 defined an axial gap of 0.2 mm to 0.4 mm between containment housing 32 and the plasma torch 20. Other operating parameters of the PTA thermal spray device were as summarised in table 2.

TABLE 2

| Parameter | Value |
|---|---|
| Pilot arc current | 50 amperes (A) |
| Transferred arc current | 145 amperes (A) |
| Granule feed rate | 30 grams per minute (g/min.) |
| Protective gas and feed rate | Argon (Ar), fed at 15 litres per minute (l/min.) |
| Pilot gas and feed rate | Argon (Ar), fed at 2 litres per minute (l/min.) |
| Powder gas and feed rate | Argon (Ar), fed at 8 litres per minute (l/min.) |

Figure 11:
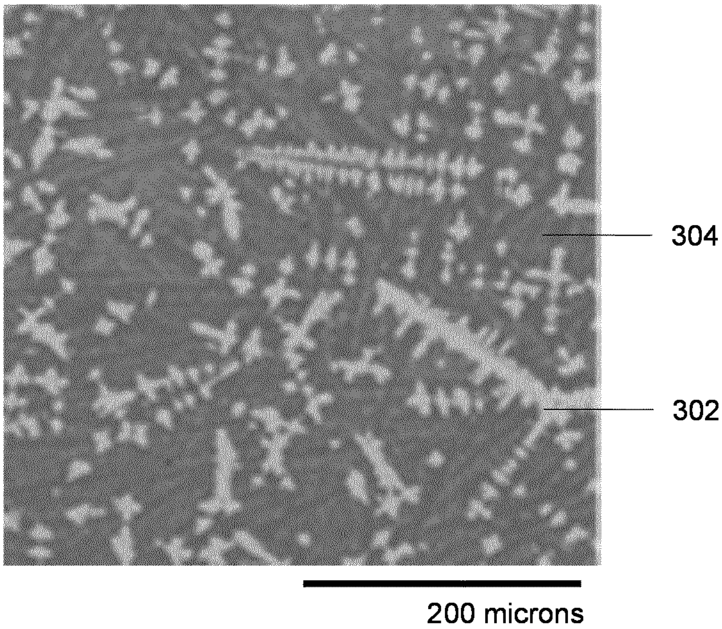
FIG. 11 shows a scanning electron micrograph (SEM) image of example material deposited by means of a thermal spray assembly.

The thickness of the deposited layer was about 3 millimeters (mm) and had a hardness of 1,000±100 Vickers units. A micrograph showing the microstructure of the layer is shown in FIG. 11. It comprises dendritic eta-phase carbide phases 302 within a matrix 304, small tungsten carbide (WC) grains and an iron (Fe)-based matrix reinforced with precipitated nano-grains of eta-phase carbide in the form of nano-scale whiskers and nano-scale discs.

The wear resistance of the deposited layer was measured using the ASTM G65 test and compared to those of three different grades of cobalt-cemented tungsten carbide (Co-WC) material, comprising 8, 10 and 15 mass percent (%) cobalt (Co). In this test, three machine tool inserts comprising each of the above mentioned grades of cemented carbide were used to machine the layer of material deposited onto the steel plate in the example described above. When the tool comprising 8 mass percent Co was applied to the deposited layer, substantially the same volume of material (about 3.8 cubic millimeters) was removed from both the tool and the layer, indicating that the wear resistance of the material deposited as described in the example was comparable to that of this grade of cemented carbide material. The volume removed from the cemented carbide grades comprising 10 and 15 mass percent (%) cobalt (Co) were 9.1 $mm^3$ and 12.2 $mm^3$, respectively, indicating that the material comprised in the layer was significantly more resistant to wear than these grades.

In a second example, the relative content of the iron (Fe) was increased to 20 mass %, compared to 15 mass % in the first example described above, the precursor material used to make the granules in the second example comprising 20 mass % Fe, 13 mass % chromium carbide ($Cr_3C_2$), 3 mass % Si and about 64 mass % WC grains. Although it was possible to manufacture and thermally spray the first granules in the second examples, it was substantially more difficult to break up the sintered aggregation produced in the sintering heat treatment step.

In a third example, the relative content of the iron (Fe) was decreased to 10 mass %, compared to 15 mass % in the first example described above, the precursor material used to make the granules in the second example comprising 10 mass % Fe, 6.67 mass % $Cr_3C_2$, 3 mass % Si and about 80 mass % WC grains. Although it was relatively easier to break up the sintered aggregation produced in the sintering heat treatment, it was substantially more difficult to achieve density of the granules.

In a fourth example, the first and second granules as described in the first example were combined in the ratio of 60:40 (as opposed to the ratio of 75:25 in the first example), thus resulting in a substantially larger amount of Fe being included in the combined precursor materials that were thermally sprayed. This was found to result in a substantially softer deposited layer.

In a fifth example, the first and second granules as described in the first example were combined in the ratio of 90:10 (as opposed to the ratio of 75:25 in the first example), thus resulting in a substantially reduced amount of Fe being included in the combined precursor materials that were thermally sprayed. In some cases, this may result in a substantially softer deposited layer. However, the exact composition of the substrate and the degree to which it may melt on contact with the material being deposited.

In some examples, a steel substrate may be relatively small and or thin and a relatively low level of power may likely need to be applied in the thermal spraying process in order to avoid or reduce the risk of damaging the steel. In such cases, molten iron group metal from the steel will unlikely be available for reacting with the sprayed material and a relatively higher proportion of the second plurality of granules (comprising the iron group metal) will likely be used.

In other examples, the steel substrate may be relatively large and therefore it may be possible to apply a relatively high level of power in the thermal spraying process. In such cases, the higher power may result in a film of molten iron group metal from the steel forming on the substrate, which may be available for reacting with the sprayed material. It may also be less likely for larger substrates to be significantly distorted by the increased heating due to the higher thermal spray power. In such cases, a relatively lower proportion of the second plurality of granules (comprising the iron-group metal) may be used.

In general, the combination of the first and second pluralities of granules, in which the second plurality comprises or consists of iron group metal such as Fe or Co may be adjusted depending on the shape, size and composition of the substrate being coated. If too much molten iron group metal is made available at the substrate surface, the coating may not be sufficiently hard. For example, excessive iron group metal may arise if the proportion of the granules comprising or consisting of the iron group metal is too high, and or if too much melting of the substrate occurs as a result of excessively high thermal spraying power Various potential aspects of at least certain of the disclosed example arrangements, granules and methods will be briefly discussed.

In some examples, the thermal spray assembly may be used to spray transformed precursor material onto a substrate and deposit a layer of material onto it, in which the layer may comprise material having substantially different properties from those of the substrate. For example, the layer may be harder or be more resistant to wear than is the substrate, which may comprise steel. For example, the granules may comprise chemical elements, chemical compounds, ceramic grains or alloys, at least some of which may chemically react with each other or undergo phase change when injected into the plasma in use and subjected to the very high temperatures within the plasma for a relatively short period, transported by the plasma jet to the substrate surface and relatively rapidly cooled to a substantially lower temperature. When injected into the plasma, reactions and phase changes within the granules may begin to take place very rapidly, resulting in one or more intermediate materials arising between the plasma torch and the substrate, having characteristics substantially different from those of the granules and the deposited material.

Certain disclosed example thermal spray assemblies may have the aspect that the risk of precursor or intermediate material becoming attached to and potentially blocking the spray orifice can be reduced or substantially eliminated. This risk will likely be greater when the precursor or intermediate materials may tend to become at least partly molten at a relatively low temperature. Consequently, disclosed example thermal spray assemblies likely have the aspect of being suitable for use with granules comprising combined precursor materials having a relatively low eutectic temperature (in other words, a relatively low minimum melting point corresponding to a particular mass ratio of constituent materials). In some examples, the risk of the spray orifice becoming blocked or distorted by attached materials may be reduced or eliminated by adjusting the guide chamber and the feeder orifice, and thus controlling the flux of precursor material granules incident on the plasma. In some examples, this may be achieved by moving the containment housing axially and or radially relative to the plasma torch. Consequently, disclosed thermal spray assemblies may have extended working lives when used to spray such materials.

Certain disclosed example thermal spray assemblies may have the aspect of reduced risk of degradation of certain constituents of precursor material, such as by oxidation or other potentially undesired chemical reactions that may occur at high temperature within the plasma. For example, the risk of degradation of tungsten carbide (WC) grains, such as the significant reduction in the size of the grains as a result of exposure to high temperature in the plasma, may be substantially reduced.

While wishing not to be bound by a particular theory, adjustment of the feeder orifice, for example by moving the containment housing, may have the effect of modifying the mean axial position of the flux of precursor material granules within the plasma. For example, when the precursor material contains constituents that are likely to become molten at a relatively low temperature or in order to reduce the risk of degradation of the precursor material, the feeder orifice may be adjusted such that a higher proportion (or substantially all) of the precursor material granules are directed towards a region of the plasma having a relatively lower temperature.

In addition, disclosed example granule distribution mechanisms are also likely to have the aspect of reducing the risk of the spray orifice becoming blocked or distorted by attached materials by the granules being sufficiently uniformly distributed azimuthally within the guide chamber and consequently around the plasma.

Other aspects of disclosed thermal spray assemblies may include enhanced uniformity of material deposition over relatively long periods of time, reduced plasma and pilot current in operation, making it possible for deposit relatively thin layers (4-5 mm) and vary parameters as desired; and increased rate of delivery of powder to the plasma jet (in terms of mass per unit time), making it feasible to deposit layers of up to 7 to 8 mm in a single operation. Disclosed example thermal spray assemblies and methods of thermal spraying or laser cladding using disclosed example granules will likely have the aspect that relatively large bodies, having a cross section dimension of at least about 30 centimeters (cm), and or bodies having relatively complex shapes can be coated relatively efficiently with protective material, particularly but not exclusively for protection from abrasive or corrosive wear. It will likely be possible to provide coatings having relatively uniform thickness and quality.

Disclosed example thermal spray assemblies comprising both a disclosed circumferential distribution chamber, deflection structures, guide chamber and an adjustable feeder orifice will likely have the aspect of substantially reduced risk of blockage of the orifice and increased likelihood of effective deposition of material of the substrate.

Disclosed example methods may have the aspect of resulting in a very effective hard face structure intimately welded onto the body, and disclosed bodies may have improved wear retardation behaviour in use.

Certain precursor materials used for thermal spray deposition of wear protection layers may have a relatively low melting point (a low eutectic phase temperature) of at most about 1,300 degrees Celsius, less than 1,280 degrees Celsius or at most about 1,200 degrees Celsius when in combination, which may increase the difficulty and reduce the efficiency of thermally spraying it. Providing the precursor material in the form of more than one plurality of granules, in which the granules of each plurality comprise different composition or other characteristics may have the aspect of permitting the compositions and certain properties of the granules, such as their melting points and flow behaviour, to be selected for enhanced behaviour within the feeder mechanism of the thermal spray device. Additionally or alternatively, it may have the aspect of enhancing the efficiency or ease of manufacture of the granules.

An example of wear protective material capable of being deposited onto certain bodies by means of thermal spraying comprises iron group metal such as iron (Fe), chromium (Cr), silicon (Si) and carbon (C), and the precursor material may have a eutectic phase temperature of at most about 1,300 degrees Celsius, less than 1,280 degrees Celsius or at most about 1,200 degrees Celsius. If a single plurality of granules is used for thermally depositing a layer of the material, each comprising the combination of materials exhibiting a eutectic phase temperature of at most about 1,300 degrees Celsius, less than 1,280 degrees Celsius or at most about 1,200 degrees Celsius, the amount of the iron group metal may be relatively high, potentially raising challenges in the manufacture of the granules. Too high a content of the iron group may increase the risk that the combined precursor materials may melt at a premature stage in the manufacture of the granules, which will make it very difficult to break up the resulting strong, solidified aggregation held together by the solidified iron group metal. Preparing the first plurality of granules comprising substantially less of the iron group metal that will ultimately need to be presented to the plasma jet can substantially reduce this risk and make it easier to granulate heat-treated precursor material. However, if the composition used to make the first plurality of granules contains too low a quantity of the iron group metal, then the strength of the aggregation of the material prepared at a stage of the manufacture of the granules will likely too low and it will be difficult to achieve strong enough granules. If the first plurality of granules is made using too little of the iron group metal, manufacture of the granules may be easier and or more efficient. The deficit in the iron group metal can be made up by introducing a second plurality of granules comprising or consisting of the iron group metal into the feeder mechanism of the thermal spray device, such that granules from both or all pluralities are present in the plasma, capable of contacting each other and melting. The second plurality may consist of commercially available grains of the iron group metal, of an appropriate size.

If the precursor grains or granules sufficiently large, then the precursor material may tend to flow more uniformly and predictably through the feeder mechanism and the risk of gains becoming lodged in corners or small spaces will likely be reduced. If the grains or granules are too large, they may not pass through the various orifices, channels and chambers of the feeder mechanism, and may result in blockages. If the size distributions and mean sizes of granules of more than one plurality are substantially different, the granules may have different flow characteristics and consequently may not pass through the feeder mechanism at similar rates, for example, and the relative quantities of the granules reaching the plasma jet may not be as desired or may be irregular.

Certain terms and concepts as used herein will be briefly explained below.

As used herein, thermal spraying processes include coating a body with a layer of material, in which molten phase material produced by heating precursor material (which may also be referred to as coating precursor, or 'feedstock') is sprayed onto a surface, thus depositing coating material onto the surface of the body. The feedstock material can be heated by various means, such as plasma or arc, or chemical means. In general, thermal spraying can potentially provide relatively thick coatings of about 20 microns to several mm (depending on the process and feedstock) over a relatively large area at high deposition rate. The precursor material may be in granular form, and will be heated to a molten or semi-molten state and finely divided (also referred to as 'atomised') droplets of the molten or semi-molten material are accelerated towards the body to be coated. The coating will likely arise from accumulation of the droplets on the body, which solidify as a plurality of flattened grains, which may be referred to as lamellae. Various operating parameters are likely to affect the properties of the coating, including the composition, form and physical properties of the precursor material, the plasma gas composition and flow rate, the energy input, the distance between the torch and the substrate (which may also be referred to as the offset distance) and cooling of the substrate.

In arc plasma spraying methods, a high temperature plasma jet emanating from a plasma torch can be generated by arc discharge and ionisation of a suitable gas passing between an anode and cathode. The temperature within the plasma will likely vary and may exceed about 10,000 degrees Celsius. Feedstock comprising precursor material may be in the form of powder or granules and conveyed by a feeder mechanism into the arc plasma. A tungsten electrode may be located within a chamber of the plasma torch and inert gas may be forced to flow past the electrode and through an orifice of a constrictor nozzle, producing a plasma jet extending through the orifice. Shield gas may be introduced surrounding the constrictor nozzle to protect the plasma jet from the ambient atmosphere. The feedstock granules may be provided dispersed in an inert carrier gas such as argon (Ar) and guided into the plasma jet. Other methods of thermal spraying include detonation spraying, wire arc spraying, flame spraying and high velocity oxy-fuel coating spraying (HVOF).

In plasma transferred arc (PTA) processes, a 'pilot arc' can be generated between a central electrode and a surrounding water-cooled nozzle comprising copper, and a 'transferred arc' can be generated between the electrode and the body being coated. Relatively high plasma arc density can be achieved in PTA processes by the ionisation of argon (Ar) gas passing through the pilot arc, which usually burns permanently during thermal spraying operation. The temperature of the transferred arc can be increased by 'throttling' to obtain a plasma column having a temperature of about 8.000 to 18.000 degrees Celsius and the transferred arc plasma jet may cause a surface region of the body to melt if it comprises metal, such as steel. An arc ignition device will likely be used to generate a spark between the cathode and the anode proximate the constrictor nozzle, so that a pilot plasma (which may also be referred to as a 'non-transferred arc') will be generated when the gas flows through the constrictor nozzle. The pilot arc will form a low resistance pathway between the cathode and the substrate to facilitate the subsequent generation of a transfer arc. PTA operating parameters can be adjusted to provide layers having thickness from about 1 to at least about 3 mm, at a rate of 1 to 13 kilograms per hour (kg/h) depending on the torch, powder and application.

As used herein, a hard face structure is a structure such as, but not limited to, a layer joined to a substrate to protect the substrate from wear or corrosion resistance, for example. The hard face structure exhibits a substantially greater wear resistance than does the substrate, and may be metallurgically fused to the substrate.

The invention claimed is:

1. A thermal spray assembly for transforming precursor material into a layer of deposited material joined to a substrate body; comprising:
- a plasma torch for producing a plasma jet from a plasma nozzle and a feeder mechanism for guiding the precursor material into the plasma jet in use and being capable of providing a feeder orifice when in an open condition;
- the feeder mechanism comprising
  - a distribution chamber configured for guiding moving precursor material azimuthally around the plasma torch,
  - a plurality of deflector structures configured for deflecting the precursor material from the distribution chamber and guiding it into
  - a guide chamber, the guide chamber configured for guiding the precursor material to the plasma jet in use, wherein the deflector structures comprise projections spaced apart from each other and extending from the distribution chamber to the guide chamber.

2. A thermal spray assembly as claimed in claim 1, in which the feeder mechanism comprises a moveable guide mechanism and is configured such that the guide chamber is capable of guiding the precursor material to the feeder orifice, through which the precursor material can move from the guide chamber and enter the plasma jet at a variable mean distance from the plasma nozzle in response to movement of the guide mechanism.

3. A thermal spray assembly as claimed in claim 1, in which the deflector structures are arranged such that the precursor material can be deflected into the guide chamber, distributed substantially uniformly azimuthally within the guide chamber.

4. A thermal spray assembly as claimed in claim 1, comprising at least two elements capable of being coupled together, one element comprising the plasma torch and the other element comprising a containment vessel for accommodating the plasma torch; the elements being cooperatively configured such that the feeder mechanism will be formed when the elements are coupled together.

5. A thermal spray assembly as claimed in claim 1, in which the feeder mechanism can be put in a closed condition, in which precursor material will be prevented from entering the plasma jet.

6. A thermal spray assembly as claimed in claim 1, in which the volume of the guide chamber converges with closer proximity to the feeder orifice.

7. A thermal spray assembly as claimed in claim 1, in which the guide chamber is bounded by inner and outer cone surfaces of respective inner and outer bodies, the inner and outer cone surfaces defining respective cone angles that differ by 4 to 10 degrees.

8. A thermal spray assembly as claimed in claim 1, in which the feeder orifice will have an annular form when in an open condition, extending azimuthally around the axis of the plasma jet in use.

9. A thermal spray assembly as claimed in claim 1, for plasma transferred arc (PTA) operation.

10. A thermal spray assembly as claimed in claim 2, in which the position of the feeder orifice relative to the plasma torch, and or the size and or shape of the feeder orifice can be varied in response to arrangement of the guide mechanism.

11. A thermal spray assembly as claimed in claim 2, in which the guide mechanism is coterminous with the feeder orifice.

12. A thermal spray assembly as claimed in claim 2, in which the guide mechanism can be moved axially relative to the plasma torch, the axis defined by the direction of the plasma jet in use.

13. A thermal spray assembly as claimed in claim 2, in which the guide mechanism comprises a moveable sleeve extending azimuthally about the plasma torch.

14. A thermal spray assembly as claimed in claim 2, in which the guide mechanism can be arranged such that the feeder orifice can provide an axial displacement of up to 1 millimeter (mm) between opposite boundaries of the feeder orifice, the axial displacement being aligned with the direction of the plasma jet in use.

15. A thermal spray assembly as claimed in claim 2, in which the feeder mechanism is configured such that the guide mechanism provides an outer boundary of the guide chamber and the plasma torch provides an inner boundary of the guide chamber.

16. A thermal spray assembly as claimed in claim 2, in which the feeder orifice will be provided as a gap between a boundary of the guide mechanism and the plasma torch.

17. A thermal spray assembly as claimed in claim 2, in which the guide chamber will extend azimuthally around the plasma torch when the thermal spray assembly is in the assembled state.

* * * * *